United States Patent [19]

Taniai et al.

[11] Patent Number: 4,980,890

[45] Date of Patent: Dec. 25, 1990

[54] SEMICONDUCTOR INTEGRATED CIRCUIT

[75] Inventors: Takayoshi Taniai; Tadashi Saitoh, both of Kawasaki; Yasuhiro Tanaka, Koshigaya, all of Japan

[73] Assignees: Fujitsu Limited; Fujitsu Micromputer Systems Limited, both of Kanagawa, Japan

[21] Appl. No.: 336,152

[22] Filed: Apr. 11, 1989

[30] Foreign Application Priority Data

Apr. 15, 1988 [JP] Japan .................................. 63-93839

[51] Int. Cl.$^5$ ....................... G06F 11/00; G01R 31/28
[52] U.S. Cl. .................................................... 371/24
[58] Field of Search .................. 371/24, 25.1, 67.1, 371/71, 15.1, 73.1

[56] References Cited

U.S. PATENT DOCUMENTS 4,750,181 6/1988 McDonald et al. ................... 371/24

Primary Examiner—Jerry Smith
Assistant Examiner—Ly V. Hua
Attorney, Agent, or Firm—Armstrong, Nikaido, Marmelstein, Kubovcik & Murray

[57] ABSTRACT

A semiconductor integrated circuit comprises an internal data bus, a first holding part for entering and holding data which are obtained from outside the semiconductor integrated circuit via the internal data bus, a reading part for reading out the data held in the first holding part and for outputting the read out data to the internal data bus, a second holding part for entering and holding the data which is read out by the reading part via the internal data bus, a third holding part for entering and holding test data which are obtained from outside the semiconductor integrated circuit bia the internal data bus, a discriminating part for comparing the data held in the second and third holding part and for obtaining a discrimination result based on whether the compared data coincide, and an output part for outputting the discrimination result of the discrimination part of the outside of the semiconductor integrated circuit.

11 Claims, 4 Drawing Sheets

4,980,890

SEMICONDUCTOR INTEGRATED CIRCUIT

BACKGROUND OF THE INVENTION

The present invention generally relates to semiconductor integrated circuits, and more particularly to a semiconductor integrated circuit having an improved testing function. The present invention is suited for application to a direct memory access controller, for example.

In a system which uses a high-speed cathode ray tube (CRT) or an input/output device such as hard disk and floppy disk drives, a large number of data transfers is generated. But a high-speed transfer cannot be expected if the data transfers are successively processed by software according to a programmable input output (PIO) system. Hence, a direct memory access (DMA) transfer system is generally employed for making such a large number of data transfers.

According to the DMA transfer system, a central processing unit (CPU) sets a source address, a destination address, and a number of words to be transferred into a register within a DMA controller (DMAC) prior to the data transfer. When the DMA transfer is started thereafter, the DMAC carries out the data transfers depending on transfer requests of input/output devices. At the same time as the data transfer, the DMAC processes in parallel the source address and the destination address and also carries out processes such as a calculation of the number of words transmitted and a discrimination of a transfer termination. For this reason, it is possible to make the data transfers at a high speed. In addition, the processing capability of the system as a whole increases because the CPU can carry out other processes during the data transfers which are controlled by the DMAC.

On the other hand, as an integration density of large scale integrated (LSI) circuits increases, internal functions of the DMAC are improved thereby making an internal random logic of the DMAC extremely complex. Hence, there is a proposed DMAC having a programmable logic array (PLA) structure in which the complex internal logic is developed into systematic AND and OR planes to facilitate the designing of the DMAC.

However, although full functions are obtainable by the high integration density and the designing facility of the DMAC is improved by employing the PLA structure in the conventional DMAC, there are problems from the point of view of a testing efficiency of the DMAC.

In other words, when actually testing the DMAC, terminals of the DMAC and a testing device are connected, for example. A known test data are written into the DMAC and then read out from the DMAC to be compared with anticipated values in the testing device. But as the functions of the DMAC improve, a number of the test data greatly increases. As a result, the test efficiency is poor in the conventional DMAC in which test cycles related to one test data span a relatively large number of cycles.

FIGS.1(A) through 1(H) are timing charts for explaining test cycles of the conventional DMAC. FIGS.1(A) and 1(B) respectively show clock signals $\phi 1$ and $\phi 2$. FIG.1(C) shows a command M2-0 which is entered into the DMAC from the testing device and includes a slave write (W) command and a slave read (R) command. FIGS.1(D), 1(E), and 1(F) respectively show states ABUS, DBUS, and dbus of an external address bus which connects the DMAC and the testing device, an external data bus which connects the DMAC and the testing device, and an internal data bus within the DMAC. FIGS.1(G) and 1(H) respectively show states STmem and outLT of a data holding memory within the DMAC and an output latch which temporarily holds the data of the data holding memory and outputs the data to the internal data bus if needed.

The test data are written as follows. In a cycle A, the testing device sets the command M2-0 to the slave write (W) command. In a cycle B, the write address is transferred on the external address bus ABUS, and an nth write data (test data) 'W DATA n' is transferred on the external data bus DBUS. In a cycle C, the nth write data 'W DATA n' is entered on the internal data bus and this write data is written into the data holding memory which is in a precharge time Pre during this cycle C.

On the other hand, the test data are read out as follows. In a cycle D, the data (for example, the previously written nth data) within the data holding memory at a read address designated by the testing device is read out when the data holding memory enters a discharge time Dis, and a read out data 'R DATA n' is held in the output latch. In a cycle E, the read out data 'R DATA n' is outputted on the internal data bus and is further outputted on the external data bus in a cycle F.

Therefore, according to the conventional DMAC, at least the six cycles A through F are required to write one test data and output the read out data onto the external data bus. Hence, there is a problem in that the test efficiency of the conventional DMAC is poor.

SUMMARY OF THE INVENTION

Accordingly, it is a general object of the present invention to provide a novel and useful semiconductor integrated circuit in which the problems described above are eliminated.

Another and more specific object of the present invention is to provide a semiconductor integrated circuit which has a circuit for carrying out a part of a testing function so that it is unnecessary to read out data to a testing device for comparison with anticipated values. According to the semiconductor integrated circuit of the present invention, it is possible to reduce a burden on the testing device and the testing efficiency is improved compared to the conventional semiconductor integrated circuit. In addition, it is possible to shorten a time required to complete the test. These advantageous features of the present invention become notable especially as the scale of the semiconductor integrated circuit becomes large.

Still another object of the present invention is to provide a semiconductor integrated circuit comprising an internal data bus, first holding means for entering and holding data which are obtained from outside the semiconductor integrated circuit via the internal data bus, reading means for reading out the data held in the first holding means and for outputting the read out data to the internal data bus, second holding means for entering and holding the data which is read out by the reading means via the internal data bus, third holding means for entering and holding test data which are obtained from outside the semiconductor integrated circuit via the internal data bus, discriminating means for comparing the data held in the second and third holding means and for obtaining a discrimination result based on whether the compared data coincide, and output means for outputting the discrimination result of the discrimination means to the outside of the semiconductor integrated circuit.

A further object of the present invention is to provide a direct memory access controller having a semiconductor integrated circuit structure, comprising an internal data bus, first holding means for entering and holding data which are obtained from outside the semiconductor integrated circuit via the internal data bus, reading means for reading out the data held in the first holding means and for outputting the read out data to the internal data bus, second holding means for entering and holding the data which is read out by the reading means via the internal data bus, third holding means for entering and holding test data which are obtained from outside the semiconductor integrated circuit via the internal data bus, discriminating means for comparing the data held in the second and third holding means and for obtaining a discrimination result based on whether the compared data coincide, and output means for outputting the discrimination result of the discrimination means to the outside of the semiconductor integrated circuit.

Other objects and further features of the present invention will be apparent from the following detailed description when read in conjunction with the accompanying drawings.

DETAILED DESCRIPTION

Figure 1:
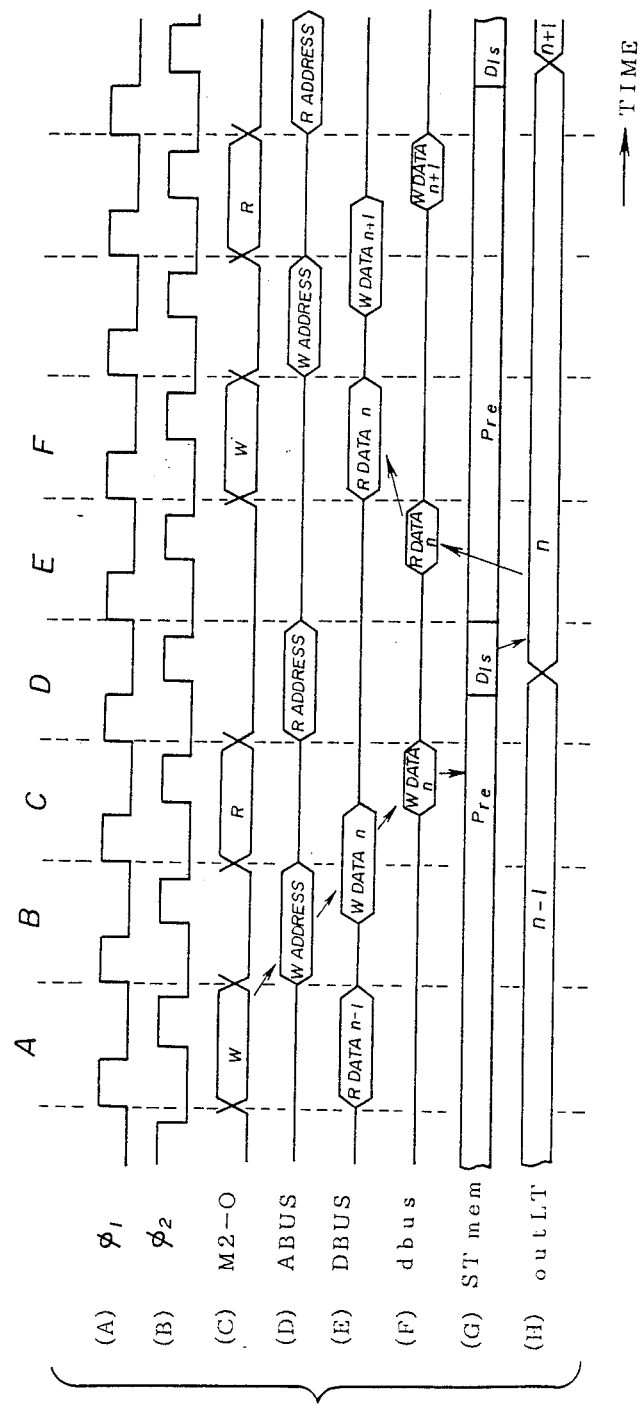
FIGS.1(A) through 1(H) are timing charts for explaining test cycles, of a conventional DMAC.
Figure 2:
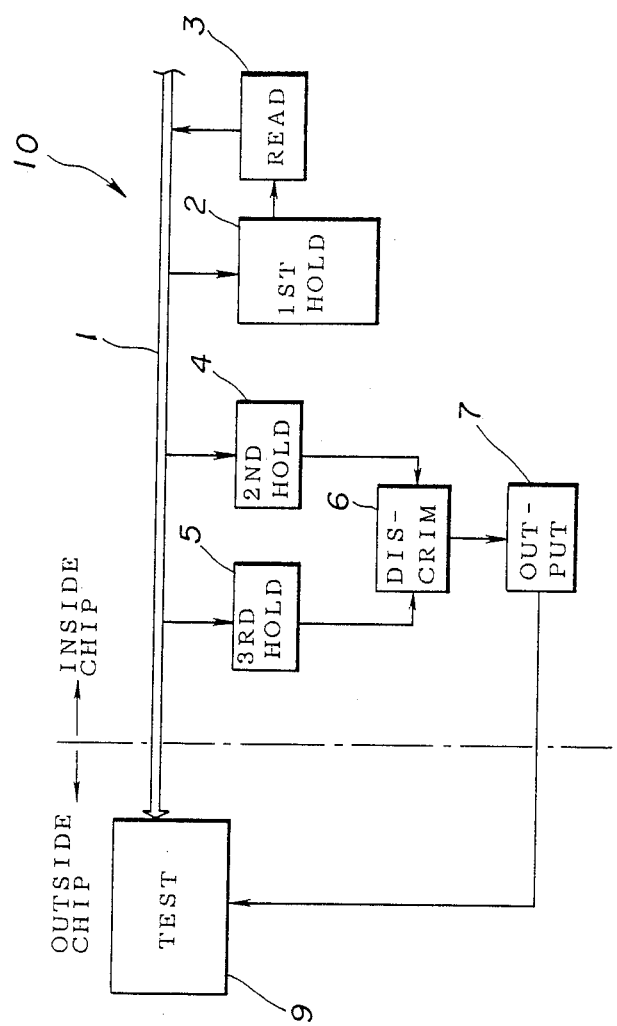
FIG.2 is a system block diagram showing a first embodiment of a semiconductor integrated circuit according to the present invention for explaining an operating princple of the present invention.

FIG.2 shows a first embodiment of a semiconductor integrated circuit according to the present invention for explaining an operating principle of the present invention. A semiconductor integrated circuit (chip) 10 has an internal data bus 1 provided within the chip, a first holding part 2 for entering and holding data obtained from outside the chip via the internal data bus 1, a reading part 3 for reading out the data held in the holding part 2 and for outputting the read out data on the internal data bus 1, a second holding part 4 for entering and holding the data read out by the reading part 3, a third holding part 5 for entering and holding predetermined test data obtained from outside the chip via the internal data bus 1, a discriminating part 6 for comparing the data held in the second and third holding parts 4 and 5 to discriminate whether or not the data coincide, and an output part 7 for outputting a discrimination result obtained in the discriminating part 6 to the outside of the chip. The data entered by the first holding part 2 and the test data entered by the third holding part 5 are obtained from a testing device 9 which is coupled externally to the chip. The discrimination result outputted from the output part 7 is supplied to the testing device 9.

When the data are written into the semiconductor integrated circuit 10 from the testing device 9 and the test data are then written into the semiconductor integrated circuit 10 from the testing device 9, the semiconductor integrated circuit 10 outputs a result of the comparison indicative of whether or not the data and the test data coincide. For this reason, there is no need for the testing device 9 to carry out a comparison of the data and the test data and make a discrimination on the result of the comparison. In other words, the testing device 9 simply needs to write the data and the test data into the semiconductor integrated circuit 10, and the testing efficiency is greatly improved.

Figure 3:
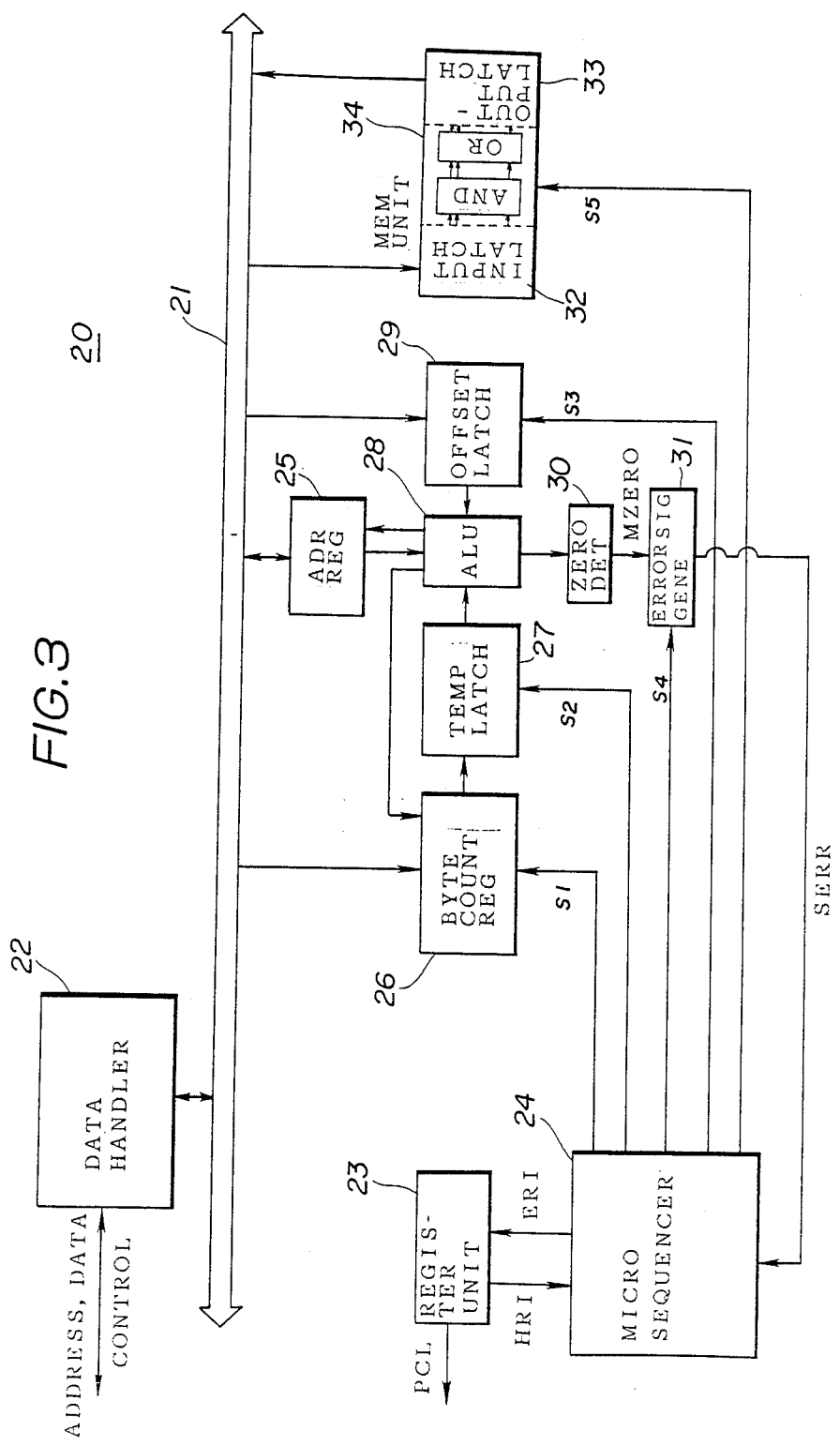
FIG.3 is a system block diagram showing an essential part of a second embodiment of the semiconductor integrated circuit according to the present invention.

Next, a description will be given of a second embodiment of the semiconductor integrated circuit according to the present invention. FIG.3 shows an essential part of this second embodiment which is applied to a direct memory access controller (DMAC). A DMAC 20 has an internal data bus 21, a data handler 22, a register unit 23, a microsequencer 24, an address register 25, a byte count register 26, a temporary latch 27, an arithmetic logic unit (ALU) 28, an offset latch 29, a zero detection circuit 30, an error signal generating circuit 31, an input latch 32, an output latch 33, and a memory unit 34 constituted by a programmable logic array (PLA).

The internal data bus 21 is coupled to an external data bus (not shown) via an input/output buffer of the data handler 22. The memory unit 34 has an input port which is coupled to the internal data bus 21 via the input latch 32 and an output port which is coupled to the internal data bus 21 via the output latch 33. For example, the memory unit 34 has a memory capacity in the order of 3000 bytes. The input latch 32 is made up of two input latch circuits inLT1 and inLT2. The byte count register 26 stores the test data via the internal data bus 21 when a control signal S1 is received from the microsequencer 24. During the normal DMA transfer, the byte count calculated in the ALU 28 is returned to the byte count register 26. The temporary latch 27 latches the data stored in the byte count register 26 when a control signal $S_2$ is received from the microsequencer 24.

The offset latch 29 latches the data obtained from the internal data bus 21, that is, the data received from the output latch 33, when a control signal $S_3$ is received from the microsequencer 24. The ALU 28 carries out a subtraction between the data latched in the temporary latch 27 and the data latched in the offset latch 29, and the zero detection circuit 30 outputs a zero detection signal MZERO indicative of the result of the subtraction carried out in the ALU 28. The zero detection signal MZERO normally has a low level and has a high level when the result of the subtraction is not "0". The error signal generating circuit 31 outputs an error signal $S_{ERR}$ which has a level dependent on the zero detection signal MZERO when a control signal $S_4$ is received from the microsequencer 24. The error signal $S_{ERR}$ is active when the zero detection signal MZERO has the high level.

The address register 25 stores a source address and a destination address of a DMA transfer, and other information related to the transfer data such as a number of words to be transferred are stored in other registers (not shown). During the normal transfer, the number of words to be transferred is stored in the byte count register 26. An address value stored in the address register 25 is renewed by a value calculated by the ALU 28. The address value obtained from the address register 25 is supplied to the data handler 22 via the internal data bus 21 and is outputted to the outside of the DMAC 20 from the data handler 22.

The register unit 23 includes registers such as a mode instruction register (not shown) for storing a high-speed slave write instruction information HRI which is entered when needed and a discrimination result register (not shown) for informing a comparison discrimination result PCL to the outside of the DMAC 20.

The microsequencer 24 has an internal micro read only memory (ROM) which stores predetermined micro programs. The microsequencer 24 starts a main program by referring to the information (HRI) within the mode instruction register of the register unit 15 and sequentially outputs the control signals $S_1$ through $S_5$ with predetermined timings. In addition, the microsequencer 24 generates a discrimination result information ERI for entering and storing the error signal $S_{ERR}$ into the register unit 23. The control signal $S_5$ generated from the microsequencer 24 is used for carrying out controls such as controlling a write (precharge Pre) and read (discharge Dis) of the memory unit 34 and controlling the latching timings of the input and output latches 32 and 33.

The input latch 32 latches a data which is obtained from outside the DMAC 20 in response to the control signal $S_5$, and the memory unit 34 enters and holds the data latched by the input latch 32 in response to the control signal $S_5$. Hence, the input latch 32 and the memory unit 34 function as the first holding part 2 shown in FIG.2. The output latch 33 functions as the reading part 3, the offset latch 29 functions as the second holding part 4, and the byte count register 26 and the temporary latch 27 function as the third holding part 5. The ALU 28, the zero detection circuit 30 and the error signal generating circuit 31 function as the discriminating part 6. The microsequencer 24 and the register unit 23 function as the output part 7.

During the normal DMA transfer and also during the test operation, the input and output data of the DMAC 20 are received and outputted via the data handler 22.

Figure 4:
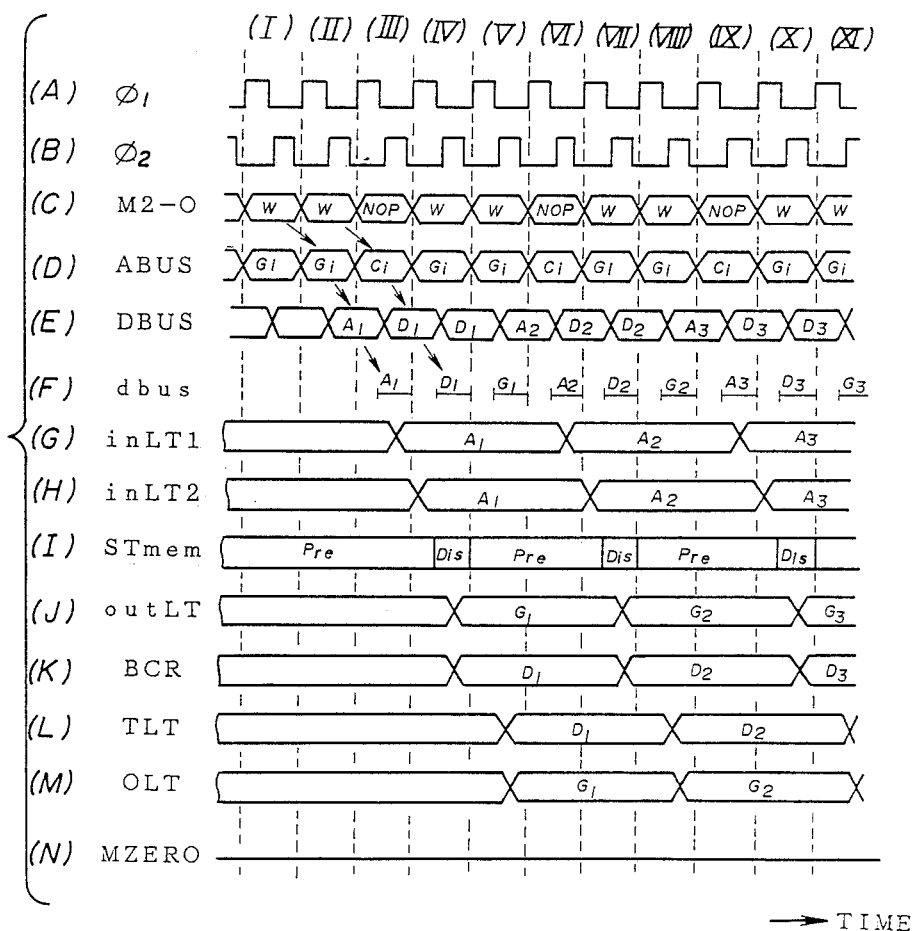
FIGS.4(A) through 4(N) are timing charts for explaining an operation of the second embodiment shown in FIG.3.

Next, a description will be given of the operation of the DMAC 20 by referring to FIGS.4(A) through 4(N). FIGS.4(A) and 4(B) respectively show clock signals $\phi 1$ and $\phi 2$ having mutually different phases. FIG.4(C) shows a test terminal signal M2-0 which is obtained from the testing device (not shown). In this embodiment, this test terminal signal M2-0 is a 3-bit signal which instructs a high-speed slave write mode when the value is "010" and instructs a non-operation mode when the value is "000". FIG.4(D) shows an address data ABUS on an external address bus (not shown), where Gi denotes an address assigned to the input latch 32 and Ci denotes an address assigned to the byte count register 26. FIG.4(E) shows a data DBUS on an external data bus (not shown), where A1, A2, . . . denote write data for the test and D1, D2, . . . denote data of anticipated output values. FIG.4(F) shows a data dbus on the internal data bus 21.

In addition, FIGS.4(G) and 4(H) respectively show states inLT1 and inLT2 of the two input latch circuits inLT1 and inLT2 of the input latch 32. FIG.4(I) shows a state STmem of the memory unit 34, and FIG.4(J) shows a state outLT of the output latch 33. FIG.4(K) shows a state BCR of the byte count register 26, FIG.4(L) shows a state TLT of the temporary latch 27, and FIG.4(M) shows a state OLT of the offset latch 29. FIG.4(N) shows a state MZERO of the zero detection circuit 30.

When the data handler 22 receives the test terminal signal M2-0 having the value "010" which is outputted from the testing device in a cycle I, the address Gi is supplied to the external address bus in a cycle II and the data A1 is supplied to the external data bus, the data A1 is supplied to the internal data bus 21 in a cycle III. The input latch 32 (inLT1 and inLT2) designated by the address Gi latches the data A1 on the internal data bus 21 in a cycle IV. The memory unit 34 has a PLA structure, and a data G1 corresponding to the data A1 latched by $\phi 1$ of the cycle IV is read out by the PLA during the discharge time Dis. The read out data G1 is latched by the output latch 33 during $\phi 2$ of the cycle IV. In addition, a data D1 on the internal data bus 21 is latched by the byte count register 26.

In a cycle V, the data D1 in the byte count register 26 is latched by the temporary latch 27, and the data G1 in the output latch 33 is latched by the offset latch 29. The data D1 and G1 are subjected to a subtraction (D1−G1) or (G1−D1) in the ALU 28, and the result of the subtraction is outputted from the zero detection circuit 30 as the zero detection signal MZERO. In other words, the zero detection signal MZERO has a low level when D1−G1=0, and the zero detection signal MZERO has a high level when D1−G1≠0. The timing of the zero detection signal MZERO is adjusted in the error signal generating circuit 31 and the error signal $S_{ERR}$ outputted therefrom is entered by the microsequencer 24. The error signal $S_{ERR}$ is outputted from the microsequencer 24 as the information ERI and is set in the discrimination result register within the register unit 23. The content (that is, ERI) of the discrimination result register is referred to by the testing device if need, and the testing device makes discriminations on the tests carried out with respect to the DMAC 20 including the input latch 32, the memory unit 34 and the output latch 33.

Because the operations in cycles VII through XI are similar to those described above, a description of the cycles VII through XI will be omitted.

According to this embodiment, when the testing device instructs the high-speed slave write mode with respect to the DMAC 20 and the write data A1, A2, . . . and the data D1, D2, . . . of the output anticipated values are entered into the DMAC 20 from the testing device, the DMAC 20 compares the data D1, D2, . . . with the data G1, G2, . . . which are obtained by writing and then reading the data A1, A2, . . . to and from the memory unit 34. The DMAC 20 returns to the testing device the information PCL which indicates the result of the comparison and the discrimination of the tests carried out with respect to the DMAC 20.

Therefore, the DMAC 20 has a circuit for carrying out a part of a testing function so that it is unnecessary to read out data to the testing device for comparison with anticipated values, and it is thus possible to reduce a burden on the testing device and the testing efficiency is improved compared to the conventional semiconductor integrated circuit because the testing device simply needs to write the data into the DMAC 20. In addition, it is possible to shorten a time required to complete the test. These advantageous features of the present invention become notable especially as the scale of the semiconductor integrated circuit such as the DMAC 20 becomes large.

Further, the present invention is not limited to these embodiments, but various variations and modifications may be made without departing from the scope of the present invention.

What is claimed is:

1. A semiconductor integrated circuit comprising:
   an internal data bus;
   first holding means for entering and holding data which are obtained from outside the semiconductor integrated circuit via said internal data bus;
   reading means for reading out the data held in said first holding means and for outputting the read out data to said internal data bus;
   second holding means for entering and holding the data which is read out by said reading means via said internal data bus;
   third holding means for entering and holding test data which are obtained from outside the semiconductor integrated circuit via said internal data bus;
   discriminating means for comparing the data held in said second and third holding means and for obtaining a discrimination result based on whether the compared data coincide; and
   output means for outputting the discrimination result of said discrimination means to the outside of the semiconductor integrated circuit.

2. The semiconductor integrated circuit as claimed in claim 1 which further comprises means for coupling the semiconductor integrated circuit to a testing device, said testing device outputting the data to be entered into said first holding means and the test data to be entered into said third holding means and receiving the discrimination result from said output means.

3. A direct memory access controller having a semiconductor integrated circuit structure, said direct memory access controller comprising:
   an internal data bus;
   first holding means for entering and holding data which are obtained from outside the semiconductor integrated circuit via said internal data bus;
   reading means for reading out the data held in said first holding means and for outputting the read out data to said internal data bus;
   second holding means for entering and holding the data which is read out by said reading means via said internal data bus;
   third holding means for entering and holding test data which are obtained from outside the semiconductor integrated circuit via said internal data bus;
   discriminating means for comparing the data held in said second and third holding means and for obtaining a discrimination result based on whether the compared data coincide; and
   output means for outputting the discrimination result of said discrimination means to the outside of the semiconductor integrated circuit.

4. The direct memory access controller as claimed in claim 3 which further comprises means for coupling the semiconductor integrated circuit to a testing device, said testing device outputting the data to be entered into said first holding means and the test data to be entered into said third holding means and receiving the discrimination result from said output means.

5. The direct memory access controller as claimed in claim 3 wherein said first holding means includes an input latch coupled to said internal data bus for latching the data which are obtained from outside the direct memory access controller via said internal data bus, and a memory unit coupled to an output of said input latch for entering and holding the data latched by said input latch.

6. The direct memory access controller as claimed in claim 5 wherein said memory unit has a programmable logic array structure.

7. The direct memory access controller as claimed in claim 5 wherein said reading means includes an output latch coupled to said internal data bus and an output of said memory unit for reading the data held in said memory unit and for outputting the read out data to said internal data bus.

8. The direct memory access controller as claimed in claim 7 wherein said second holding means includes an offset latch coupled to said internal data bus for entering and holding the data which is read out by said output latch via said internal data bus, and said third holding means includes a byte count register coupled to said internal data bus for entering and storing the test data via said internal data bus and a temporary latch. for latching the data stored in said byte count register.

9. The direct memory access controller as claimed in claim 8 wherein said discriminating means includes an arithmetic logic unit coupled to said offset latch and said temporary latch for carrying out a subtraction between the data latched in said offset latch and said temporary latch, a zero detection circuit coupled to said arithmetic logic unit for outputting a zero detection signal indicative of a result of the subtraction carried out in said arithmetic logic unit, and an error signal generating circuit coupled to said zero detection circuit for outputting an error signal dependent on the zero detection signal.

10. The direct memory access controller as claimed in claim 9 wherein said output means includes a microsequencer and a register unit, said microsequencer receiving the error signal from said error signal generating circuit and controlling operation timings of said input latch, said memory unit, said output latch, said offset latch, said byte count register, said temporary latch, said arithmetic logic unit, said zero detection circuit, and said error signal generating circuit, said register unit storing an information which is indicative of a result of a test and is received from said microsequencer responsive to the error signal.

11. The direct memory access controller as claimed in claim 9 which further comprises an address register coupled between said internal data bus and said arithmetic logic unit for storing a source address, a destination address.

* * * * *

UNITED STATES PATENT AND TRADEMARK OFFICE
CERTIFICATE OF CORRECTION

PATENT NO. : 4,980,890
DATED : December 25, 1990
INVENTOR(S) : Takayoshi TANIAI et al It is certified that error appears in the above-identified patent and that said Letters Patent is hereby corrected as shown below:

On the cover page, Item [73], "Fujitsu Micromputer Systems Limited", should read -- Fujitsu Microcomputer Systems Limited --.

Signed and Sealed this

First Day of September, 1992

*Attest:*

DOUGLAS B. COMER

*Attesting Officer*     *Acting Commissioner of Patents and Trademarks*